United States Patent Office 3,575,928
Patented Apr. 20, 1971

3,575,928
HIGH MOLECULAR WEIGHT LINEAR AROMATIC
POLYESTER AMIDES
Gunther Lenz and Heinrich Krimm, Krefeld-Bockum, and Hermann Schnell, Krefeld-Uerdingen, Germany, assignors to Farbenfabriken Bayer Aktiengesellschaft, Leverkusen, Germany
No Drawing. Filed Aug. 15, 1969, Ser. No. 850,645
Claims priority, application Germany, Aug. 24, 1968, P 17 95 224.8
Int. Cl. C08g 20/30
U.S. Cl. 260—47
8 Claims

ABSTRACT OF THE DISCLOSURE

High molecular weight linear aromatic polyester amides obtained by polycondensation of polynuclear aromatic aminophenols, the aromatic nuclei of which are linked together by alkylene or cycloalkylene radical or by oxygen or sulfur, with aromatic dicarboxylic acid derivatives, the polyester amides being soluble in numerous organic solvents.

The invention relates to new high molecular weight linear aromatic polyester amides which have useful properties, and to a process for preparing them.

The production of high molecular weight polyester amides by reacting dicarboxylic acids or their derivatives with dihydroxy compounds and diamines, or with hydroxyamino compounds is known. Polyester amides obtained from pure aliphatic, or from mixed aliphatic-aromatic starting materials, have relatively low softening temperatures, but the pure aromatic polyester amides hitherto known, e.g. the products prepared by polycondensation of terephthalic or isophthalic acid dichlorides with bisphenols and aromatic diamines or with aminophenols, are insoluble and in most cases infusible. For this reason, aromatic polyester amides have not hitherto achieved any importance as synthetic resins.

It is an object of this invention to provide new high molecular weight aromatic polyester amides that do not have the disadvantages mentioned above.

This object is accomplished by a high molecular weight aromatic polyester amide of the general formula

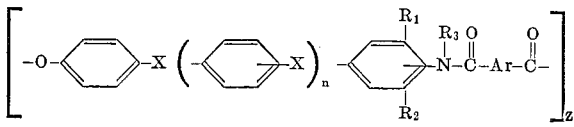

wherein $R_1$ and $R_2$ represent hydrogen, a $C_1$–$C_3$ alkyl radical or a Cl or Br atom;
$R_3$ represents hydrogen, a $C_1$–$C_4$ alkyl radical or a $C_6$–$C_{12}$ aryl radical;
Ar represents a p- or m-phenylene radical or a diphenylene, diphenylalkylene, diphenyl ether or diphenyl sulphide radical;
X represents a single bond, a $C_1$–$C_5$ alkylene or isoalkylene radical or a $C_5$–$C_{12}$ cycloalkylene radical or an O- or S-atom;
n represent zero or 1; and
z represents an integer greater than 5, said polyester amide having a reduced viscosity $$\eta_{red} = \frac{\eta_{rel}-1}{c}$$

of at least 0.5.

These new polyester amides are soluble in numerous organic solvents such as methylene chloride, chlorobenzene, chloroform, tetrahydrofuran, cyclohexanone, N-methyl pyrrolidone and pyridine and have high softening temperatures and other valuable properties useful for synthetic resins.

They can be worked up from such solvents or from the melt in an injection moulding apparatus or in screw extruders.

A particularly advantageous and characteristic property of the products of the process is their high thermal resistance. As they have solidification temperatures of up to about 240° C. and are temperature resistant at temperatures above 400° C., they can be worked up into products such as injection moulded articles, films, foils or fibres which can be used at temperatures above 200° C.

The products also have high mechanical strength such as bending and impact bending resistance and high modulus of elasticity. Therefore, they constitute synthetic resins with particularly valuable properties. They can be orientated by stretching and are thus suitable for the production of high temperature resistant fibres and foils. High temperature resistant films and coatings can be produced from their solutions. Dyes, pigments and fillers as well as reinforcing elements such as glass fibres can also be incorporated in the products.

The new high molecular weight aromatic polyester amides are obtained by a process which comprises polycondensing an aromatic hydroxyamino compound of the general formula:

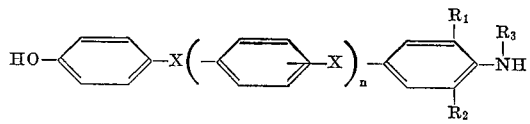

wherein $R_1$, $R_2$, $R_3$, X and n have the same meaning as given above, with a bifunctional derivative of an aromatic dicarboxylic acid of the general formula

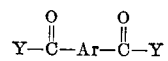

wherein

Ar has the same meaning as given above, and
Y represents a halogen atom or a radical of the general formula

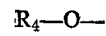

wherein $R_4$ is a lower alkyl radical or a phenyl radical, said polycondensing being carried out at temperatures in the range of from about —20° C. to about 350° C.

The following are mentioned as examples of hydroxyamino compounds of the above general formula which may be used as starting compounds according to the invention:

4-hydroxy-4′-aminodiphenyl,
4-hydroxy-4′-methylaminodiphenyl,
4-hydroxy-4′-aminodiphenyl ether,
4-hydroxy-4′-isopropylaminodiphenylsulphide,
4-hydroxy-4′-methylaminodiphenyl methane and
4-hydroxy-4′-aminodiphenyl methane.

Preferred are: hydroxyamino-diphenylalkane derivatives such as 2,2-(4-hydroxy-4′-aminodiphenyl)-propane,
2,2-(4-hydroxy-4′-methylaminodiphenyl)-propane,
2,2-(4-hydroxy-4′-ethylamino-diphenyl)-propane,
2,2-(4-hydroxy-4′-isopropylamino-diphenyl)-propane,
2,2-(4-hydroxy-4′-aminodiphenyl)-butane,
3,3-(4-hydroxy-4′-methylaminodiphenyl)-pentane,
1,1-(4-hydroxy-4′-aminodiphenyl)-cyclohexane,
2,2-(4-hydroxy-4′-amino-3′-methyldiphenyl)-propane and
2,2-(4-hydroxy-4′-amino-3′,5′-dimethyldiphenyl)-propane, and also trinuclear hydroxyamino compounds such as α,α'-(4-hydroxy-4'-aminodiphenyl)-p-diisopropylbenzene,
α,α'-(4-hydroxy-4'-methylamino-diphenyl)-p-diisopropylbenzene,
α,α'-(4-hydroxy-4'-ethylamino-diphenyl)-p-diisopropylbenzene,
α,α'-(4-hydroxy-2'-amino-diphenyl)-p-diisopropylbenzene,
α,α'-(4-hydroxy-4'-ethylamino-diphenyl)-m-diisopropylbenzene and
α,α'-(4-hydroxy-4'-amino-diphenyl)-p-diisobutylbenzene.

The above mentioned dinuclear hydroxyamino diphenyl alkane derivatives can be prepared, for example, according to U.S. patent specification 3,311,660 by reacting the corresponding isoalkenylphenols with anilines or N-alkyl anilines in the presence of catalysts; and the above mentioned trinuclear hydroxyamino - diphenyl-diisoalkylbenzenes can be prepared by reacting 2,2-(4-hydroxy-4'-isoalkenyldiphenyl)-propane with the corresponding anilines in the presence of catalysts.

The aromatic dicarboxylic acid derivatives to be used according to the invention and having the general formula Y—CO—Ar—CO—Y wherein Ar and Y have the meaning as given above are preferably derivatives of terephthalic and isophthalic acid, but also may be derivatives of other dicarboxylic acids, e.g. derivatives of naphthalene dicarboxylic acid, diphenyldicarboxylic acid, diphenyl ether dicarboxylic acid and 2,2-diphenyl-propane-4,4'-dicarboxylic acid.

Bifunctional derivatives of the above mentioned dicarboxylic acids which are suitable for the invention are, for example, their dihalides, preferably the dichlorides, and their diesters, e.g. dimethyl or diethyl esters, but preferably the diphenyl esters.

The process may be carried out in various ways. One method which proceeds very smoothly uses as starting materials the dihalides, preferably dichlorides, of the aromatic dicarboxylic acids. These are reacted with an approximately equivalent quantity of one of the above mentioned aromatic hydroxyamino compounds in the temperature range of about −20° C. to about +50° C., preferably at about 0 to about 20° C., in inert organic solvents such as benzene, toluene, methylene chloride, carbon tetrachloride, chlorobenzene, chloroform, ethylene chloride, dioxane, tetrahydrofuran, cyclohexanone, N-methyl pyrrolidone or pyridine, either in homogeneous solution in the presence of the equivalent quantity of tertiary amines such as triethylamine, dimethylaniline, quinoline or pyridine or in a two phase reaction medium in the presence of aqueous solutions of alkali metal hydroxides or carbonates with the addition of a small quantity of a tertiary amine such as triethylamine, dimethylcyclohexylamine, dimethylaniline, quinoline or tributylamine as catalyst.

Another method of carrying out the process of the invention consists in polycondensing a diester, preferably the diphenyl ester, of one of the above mentioned aromatic dicarboxylic acids with an equivalent quantity of one of the hydroxy-amino compounds to be used according to the invention, in the melt, preferably in the presence of a small quantity of a basic catalyst and under reduced pressure, while at the same time distilling off the hydroxy compound liberated, preferably the phenol, in the temperature range of between about 150° C. and about 350° C., preferably between 200° C. and about 300° C., the polycondensation being continued until the required melt viscosity is reached.

Basic catalysts which may be included in this process are, for example, alkali metals and the hydroxides, oxides, alcoholates, phenolates and alkyl or aryl carboxylates of alkali metals or of alkaline earth metals. The amount of these catalysts is preferably between about 0.0001 and about 0.1 percent by weight of the dicarboxylic acid ester.

The following examples are to further illustrate the invention without limiting it.

The reduced viscosity $\eta_{red}$ given in the examples is defined by $$\eta_{red} = \frac{\eta_{rel}-1}{c}$$

EXAMPLE 1

Polyester amide of 2,2-(4-hydroxy-4'-amino-diphenyl)-propane and terephthalic acid dichloride 11.4 g. (0.05 mol) of 2,2-(4-hydroxy-4'-amino-diphenyl)-propane are dissolved in 300 ml. of cyclohexanone and mixed with a solution of 4.4 g. (0.11 mol) of sodium hydroxide in 40 ml. of water. A solution of 10.7 g. (0.052 mol) of terephthalic acid dichloride in 100 ml. of cyclohexanone is added dropwise at about 20° C. to the rapidly stirred mixture within 5 minutes. 0.1 g. of triethylamine is then added as catalyst and the reaction mixture is stirred for a further 30 minutes. The viscous mixture is diluted with 100 ml. of cyclohexanone and acidified with dilute phosphoric acid. The organic phase is separated off and washed free of electrolyte by water. The solution of the polyester amide is then dried over sodium sulphate and the product is isolated by concentrating the solution by evaporation and introducing it dropwise into 1 litre of methanol. The precipitated polyester amide is separated by suction filtration and dried in vacuo. The yield is 16 g. (85% of the theory). The reduced viscosity, determined in m-cresol, is 2.0. The product has a solidification temperature determined by differential thermoanalysis (DTA) of 238° C. The decomposition temperature is about 400° C. The high molecular weight, viscous product can be worked up from solutions in cyclohexanone, tetrahydrofuran, pyridine or N-methyl pyrrolidone to form films, foils, fibres or moulded articles. It can also be shaped as desired from the melt in screw extruders.

EXAMPLE 2

Polyester amide of 2,2-(4-hydroxy-4'-amino-diphenyl)-propane and isophthalic acid dichloride In the same way as described in Example 1, 11.4 g. (0.05 mol) of 2,2-(4-hydroxy-4'-amino-diphenyl)-propane in cyclohexanone solution are polycondensed with 10.7 g. (0.052 mol) of isophthalic acid dichloride in the presence of a solution of 4.4 g. (0.11 mol) of sodium hydroxide in 40 ml. of water. The high molecular weight polyester amide, obtained in a yield of approximately 90% of theory, has a reduced viscosity of 0.7, determined in m-cresol, and a solidification temperature of 223° C. measured by DTA. It is heat stable up to about 400° C. The elastic, tough material can be worked up from solution in solvents such as cyclohexanone, tetrahydrofuran, pyridine or N-methyl pyrrolidone to form films, foils or moulded products. It can also be shaped from the melt in injection moulding apparatus.

EXAMPLE 3

Polyester amide of 2,2-(4-hydroxy-4'-amino-3'-methyldiphenyl)-propane and terephthalic acid dichloride 12.05 g. (0.05 mol) of 2,2-(4-hydroxy-4'-amino-3'-methyl-diphenyl)-propane dissolved in 300 ml. of cyclohexanone and mixed with a solution of 4.4 g. (0.11 mol) of sodium hydroxide dissolved in 40 ml. of water. A solution of 10.6 g. (0.052 mol) of terephthalic acid dichloride in 100 ml. of cyclohexanone is added to this mixture with vigorous stirring within one minute at about 0° C., after the addition of 0.1 g. of triethylamine as catalyst, and the mixture is then stirred for a further 30 minutes at 0° to 10° C. After separation of the phases, the organic solution is washed free of electrolyte, dried over sodium sulphate and concentrated by evaporation, and the polyester amide is precipitated in ligroin, filtered under suction and dried in vacuo.

The tough, elastic material which is obtained in 96% yield has a reduced viscosity of 1.0 determined in m-cresol and a solidification temperature of 225° C. and is heat resistant up to about 360° C.

EXAMPLE 4

Polyester amide of 2,2-(4-hydroxy-4'-amino-3'-methyl-diphenyl)-propane and isophthalic acid dichloride As described in Example 3, 12.05 g. (0.05 mol) of 2,2-(4-hydroxy - 4' - amino-3'-methyl-diphenyl)-propane in cyclohexanone solution are polycondensed with 10.6 g. (0.052 mol) of isophthalic acid dichloride in the presence of 4.4 g. (0.11 mol) of sodium hydroxide dissolved in water.

A high molecular weight polyester amide, which has a reduced viscosity of 0.7 determined in m-cresol, is obtained in 98% yield. The solidification temperature is 210° C. and the decomposition temperature about 350° C.

EXAMPLE 5

Polyester amide 2,2-(4-hydroxy-4'-amino-3',5'-dimethyl-diphenyl)-propane and isophthalic acid dichloride 12.8 g. (0.05 mol) of 2,2-(4-hydroxy-4'-amino-3',5'-dimethyl-diphenyl)-propane are polycondensed with 10.6 g. (0.52 mol) of isophthalic acid dichloride in the presence of 0.11 mol of sodium hydroxide, as aqueous solution, by the method described in Example 3. A polyester amide which has a reduced viscosity of 0.6 determined in m-cresol is obtained in 93% yield. The solidification temperature is 210° C. and the decomposition temperature about 350° C. The material is soluble in cyclohexanone, tetrahydrofuran, pyridine and N-methyl pyrrolidone and can be worked up into shaped products from solutions and from the melt.

EXAMPLE 6

Polyester amide of α,α'-(4-hydroxy-4'-amino-diphenyl)-p-diisopropylbenzene and terephthalic acid dichloride 5.9 g. (0.017 mol) of α,α'-(4-hydroxy-4'-amino-diphenyl)-p-diisopropylbenzene are polycondensed as described in Example 3 with 3.5 g. (0.17 mol) of terephthalic acid dichloride in cyclohexanone solution in a two phase medium in the presence of 1.4 g. (0.034 mol) of sodium hydroxide dissolved in 15 ml. of water. The polyester amide is isolated by precipitation in methanol and has a reduced viscosity of 0.6. The solidification temperature is 146° C. and the decomposition temperature about 300° C.

EXAMPLE 7

Polyester amide of 2,2-(5-hydroxy-4'-methylamino-diphenyl)-propane and terephthalic acid dichloride A solution of 5.6 g. (0.052 mol) of terephthalic acid dichloride in 100 ml. of methylene chloride is added dropwise within 5 minutes at about 20° C. to a vigorously stirred solution of 12.05 g. (0.05 mol) of 2,2-(4-hydroxy-4'-methylaminodiphenyl)-propane in 300 ml. of methylene chloride, mixed with a solution of 4.4 g. (0.11 mol) of sodium hydroxide in 40 ml. of water. After the addition of 0.1 g. of triethylamine as catalyst, the reaction mixture is stirred for 30 minutes and acidified, the phases are separated and the organic solution is washed with water. After the solution has been dried over sodium sulphate, it is concentrated by evaporation and the product is precipitated in ligroin. The yield is about 75% of the theory. The N-methyl substituted polyester amide, which has a reduced viscosity of 0.6 measured in methylene chloride, is soluble in ethylene chloride, chlorobenzene, toluene, cyclohexanone, tetrahydrofuran and pyridine and can be worked up from solutions and from the melt to produce shaped products of all kinds. The solidification temperature is 188° C. determined by DTA; the material is heat stable up to about 400° C.

EXAMPLE 8

Polyester amide 2,2-(4-hydroxy-4'-methylamino-diphenyl)-propane and isophthalic acid dichloride 12.05 g. (0.05 mol) of 2,2-(4-hydroxy-4'-methylamino-diphenyl)-propane dissolved in methylene chloride are polycondensed with 10.6 g. (0.052 mol) of isophthalic acid dichloride in the presence of 0.11 mol of sodium hydroxide in aqueous solution by the method described in Example 7 and under the same conditions. A product, which has a reduced viscosity of 0.5 determined in methylene chloride, is obtained in approximately 85% yield. The solidification temperature is 169° C. and the thermal decomposition point about 400° C. This material can be worked up from solutions in the solvents mentioned in Example 7 and from the melt.

EXAMPLE 9

Polyester amide of α,α'-(4-hydroxy-4'-methylamino-diphenyl)-p-diisopropylbenze and terephthalic acid dichloride 9 g. (0.025 mol) of α,α'-(4-hydroxy-4'-methylamino-diphenyl)-p-diiospropylbenzene in methylene chloride solution are reacted with 5.1 g. (0.025 mol) of terephthalic acid dichloride in the presence of an aqueous solution of 2.2 g. (0.055 mol) of sodium hydroxide and 0.1 g. of triethylamine as catalyst by the method indicated in Example 1. The polyester amide which is obtained in 90% yield has a reduced viscosity of 0.5, a solidification temperature of 155° C. and is heat resistant up to about 320° C.

EXAMPLE 10

Polyester amide of 2,2-(4-hydroxy-4'-amino-diphenyl)-propane and diphenyl terephthalate A mixture of 11.4 g. (0.05 mol) of 2,2-(4-hydroxy-4'-amino-diphenyl)-propane and 17.5 g. (0.055 mol) of diphenyl terephthalate is melted under a nitrogen atomosphere in an apparatus which can be evacuated and which is fitted with a stirrer, and is heated to a temperature of about 200° C. The reaction starts at this temperature under a vacuum of 100 mm. Hg, phenol being formed, which is distilled off and condensed in a cooling trap. The vacuum is increased stepwise to about 10 mm. Hg, and about 4 g. of phenol, i.e. about half the expected amount of phenol, are evolved within one hour. A small quantity, about 0.1 mg., of sodium bisphenolate is added as catalyst and the reaction is continued with slow heating to a final temperature of about 300° C., the vacuum being at the same time increased to 0.3 mm. Hg, again about 5 g. of phenol being evolved. Towards the end of the reaction, the melt becomes highly viscous and tough. When cold, the hard, solid product can be dissolved in solvents such as cyclohexanone, cresol, tetrahydrofuran and pyridine and worked up from solutions and from the melt to form shaped products of any desired kind. It has a reduced viscosity of 0.6 determined in m-cresol and a solidification temperature of 235° C. The yield is about 85% of the theory.

EXAMPLE 11

Polyester amide of 2,2-(4-hydroxy-4'-amino-diphenyl)-propane and diphenyl isophthalate 11.4 g. (0.05 mol) of 2,2-(4-hydroxy-4'-amino-diphenyl)-propane are polycondensed with 17.5 g. (0.055 mol) of diphenyl isophthalate by the method described in Example 10, phenol being formed and a high molecular weight polyester amide being obtained. The product, which is obtained in a yield of 85% of the theory, has a reduced viscosity of 0.6 determined in m-cresol, a solification temperature of 220° C. and a thermal stability of up to about 375° C. It can be worked up from solutions and from the melt.

EXAMPLE 12

Polyester amide of 2,2-(4-hydroxy-4'-methylaminophenyl)-propane and diphenyl isophthalate 12.05 g. (0.05 mol) of 2,2-(4-hydroxy-4'-methylaminodiphenyl)-propane are polycondensed in the same way as described in Example 10 with 17.5 g. (0.055 mole) of diphenyl isophthalate in the melt to produce the high molecular weight polyester amide, phenol being evolved in the process. The product, which has a reduced viscosity of 0.7 determined in methylene chloride, has a solidification temperature of 165° C. and is heat stable up to about 380° C.

What we claim is:

1. A process for the production of high molecular weight aromatic polyester amides which comprises polycondensing an aromatic hydroxy amino compound of the general formula

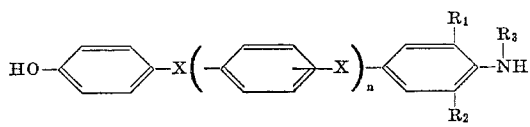

wherein $R_1$ and $R_2$ represent hydrogen, a $C_1$ to $C_3$ alkyl radical, a Cl, or Br atom;

$R_3$ represents hydrogen, a $C_1$–$C_4$ alkyl radical, or a $C_6$–$C_{12}$ aryl radical;

X represents a single bond, a $C_1$–$C_5$ alkylene radical, a $C_1$–$C_5$ isoalkylene radical, a $C_5$–$C_{12}$ cycloalkylene radical, an O- or an S-atom;

$n$ represents 0 or 1;

with a bifunctional derivative of an aromatic dicarboxylic acid of the general formula

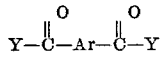

wherein

Ar represents a p- or m-phenylene radical, a diphenylene radical, a diphenylalkylene radical, a diphenylether radical, or a diphenylsulfide radical; and wherein Y represents a halogen atom or a radical of the general formula

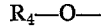

wherein $R_4$ is a lower alkyl radical or a phenyl radical; said polycondensing being carried out at a temperature in the range of from about −20° C. to about 350° C.

2. The process of claim 1, said bifunctional derivative of an aromatic dicarboxylic acid being a dicarboxylic acid dihalide, said polycondensing being carried out in an inert organic solvent at a temperature of from about −20 to about +50° C. in the presence of the equivalent amount of a tertiary amine.

3. The process of claim 1, said bifunctional derivative of an aromatic dicarboxylic acid being a dicarboxylic acid diphenylester, said polycondensing being carried out in the melt at temperatures of from 150° C. to 300° C.

4. The process of claim 3, said polycondensing being carried out in the presence of 0.0001 to 0.1% by weight, based on the diphenylester, of a basic catalyst.

5. The process of claim 1, said bifunctional derivative of an aromatic dicarboxylic acid being a dicarboxylic acid dihalide, said polycondensing being carried out in a two phase reaction medium, one of said two phases being an aqueous solution of a basic compound selected from the group consisting of an alkali metal hydroxide and an alkali metal carbonate at a temperature of from −20° C. to +50° C.

6. The process of claim 5, said polycondensing being carried out in the presence of a tertiary amine.

7. The process of claim 5, said polycondensation being carried out in a two-phase reaction medium, one of said two phases being cyclohexanone.

8. The process of claim 1 which comprises an interfacial polycondensation using 2,2-(4-hydroxy-4'-aminodiphenyl)-propane and terephthalic or isophthalic acid chloride in a cyclohexanone solvent.

References Cited

UNITED STATES PATENTS

| | | | |
|---|---|---|---|
| 3,033,827 | 5/1962 | Kibler et al. | 260—77 |
| 3,277,774 | 9/1966 | Moyer | 260—47 |
| 3,440,218 | 4/1969 | Caldwell | 260—47 |

WILLIAM H. SHORT, Primary Examiner

L. L. LEE, Assistant Examiner

U.S. Cl. X.R.

260—75